United States Patent
Chopdekar et al.

(10) Patent No.: US 11,870,835 B2
(45) Date of Patent: Jan. 9, 2024

(54) WORD-BASED REPRESENTATION OF COMMUNICATION SESSION QUALITY

(71) Applicant: Avaya Management L.P., Durham, NC (US)

(72) Inventors: Sandesh Chopdekar, Pune (IN); Pushkar Yashavant Deole, Pune (IN); Navin Daga, Silapathar (IN); Valentine C. Matula, Granville, OH (US)

(73) Assignee: Avaya Management L.P., Morristown, NJ (US)

( * ) Notice: Subject to any disclaimer, the term of this patent is extended or adjusted under 35 U.S.C. 154(b) by 363 days.

(21) Appl. No.: 17/182,512

(22) Filed: Feb. 23, 2021

(65) Prior Publication Data
US 2022/0272141 A1    Aug. 25, 2022

(51) Int. Cl.
*H04L 65/80* (2022.01)
*H04L 43/0829* (2022.01)
*G10L 15/30* (2013.01)
*G10L 15/08* (2006.01)
*G10L 15/22* (2006.01)
*H04L 65/403* (2022.01)

(52) U.S. Cl.
CPC .............. *H04L 65/80* (2013.01); *G10L 15/08* (2013.01); *G10L 15/22* (2013.01); *G10L 15/30* (2013.01); *H04L 43/0829* (2013.01); *H04L 65/403* (2013.01)

(58) Field of Classification Search
CPC ......... H04M 3/568; H04N 7/15; G10L 15/08; G10L 15/22; G10L 15/30; G10L 15/26; G10L 25/51; G10L 25/60; H04L 65/80; H04L 43/0829; H04L 65/403; H04L 65/1083
See application file for complete search history.

(56) References Cited

U.S. PATENT DOCUMENTS

| | | | |
|---|---|---|---|
| 2003/0008633 A1* | 1/2003 | Bartosik | G06Q 10/10 455/406 |
| 2005/0080625 A1* | 4/2005 | Bennett | G10L 15/183 704/E15.047 |

(Continued)

OTHER PUBLICATIONS

"Improved LSI-Based Natural Language Call Routing Using Speech Recognition Confidence Scores"; Matula et al.; Second IEEE International Conference on Computational Cybernetics, 2004. ICCC 2004. (Year: 2004).*

*Primary Examiner* — Benjamin H Elliott, IV

(57) ABSTRACT

The technology disclosed herein enables user notification of word inconsistencies to indicate session quality. In a particular embodiment, a method includes, during a communication session between a first endpoint operated by a first participant and a second endpoint operated by a second participant, determining a first number of words spoken by the first participant during a period of time based on sound captured by the first endpoint for inclusion on the communication session. The method also includes determining a second number of the words spoken by the first participant during the period of time based on audio received at the second endpoint via the communication session. Upon determining that an inconsistency exists between the first number and the second number, the method includes notifying at least one of the first participant and the second participant about the inconsistency.

20 Claims, 9 Drawing Sheets

(56) References Cited

U.S. PATENT DOCUMENTS

| | | | |
|---|---|---|---|
| 2006/0095251 A1* | 5/2006 | Shaw | G10L 15/08 704/9 |
| 2013/0039483 A1* | 2/2013 | Wolfeld | H04M 3/00 379/265.03 |
| 2013/0262108 A1* | 10/2013 | Kurzweil | G09B 5/06 704/235 |
| 2013/0297291 A1* | 11/2013 | Bostick | G06F 40/189 704/9 |
| 2013/0325448 A1* | 12/2013 | Levien | G10L 19/00 704/201 |
| 2016/0055235 A1* | 2/2016 | Zhang | G06F 40/30 707/749 |
| 2016/0133247 A1* | 5/2016 | Bostick | G06F 40/157 704/235 |
| 2016/0284342 A1* | 9/2016 | Bostick | G10L 15/1822 |
| 2017/0116979 A1* | 4/2017 | Bostick | G06F 40/268 |
| 2019/0204998 A1* | 7/2019 | Hartrell | G10L 15/26 |
| 2019/0378493 A1* | 12/2019 | Kim | G10L 15/05 |
| 2020/0175961 A1* | 6/2020 | Thomson | G10L 15/28 |
| 2020/0175962 A1* | 6/2020 | Thomson | G10L 15/197 |
| 2020/0175987 A1* | 6/2020 | Thomson | G10L 15/26 |
| 2021/0182902 A1* | 6/2021 | Scott-Green | G10L 15/22 |
| 2022/0059075 A1* | 2/2022 | Thomson | G10L 15/08 |
| 2022/0084524 A1* | 3/2022 | Hou | G06F 16/31 |
| 2022/0254348 A1* | 8/2022 | Tay | G10L 15/26 |
| 2022/0272141 A1* | 8/2022 | Chopdekar | G10L 15/26 |

* cited by examiner

US 11,870,835 B2

WORD-BASED REPRESENTATION OF COMMUNICATION SESSION QUALITY

TECHNICAL BACKGROUND

During a modern communication session (e.g., an audio/video conference) information may be available to a moderator, or other participants, that provides facts about the communication session. The information may include a participant list, an indication of who is speaking, an indication of who is on mute, and/or network statistics, such as streaming bit rates. The network statistics may be used to understand the communication session's quality of service (QoS). However, for most users, who likely do not have information about network topology, transmission protocols, etc., the network statistics may not be useful for a user to determine that a network issue exists. In fact, a typical user may be most concerned with whether the words they are speaking are being heard properly by other participants on the communication session. Without being able to deduce issues from the network statistics, the speaking user may have to resort to asking questions to the other participants, such as "can everyone hear me?", which may not even be heard by the other participants if issues are occurring.

SUMMARY

The technology disclosed herein enables user notification of word inconsistencies to indicate session quality. In a particular embodiment, a method includes, during a communication session between a first endpoint operated by a first participant and a second endpoint operated by a second participant, determining a first number of words spoken by the first participant during a period of time based on sound captured by the first endpoint for inclusion on the communication session. The method also includes determining a second number of the words spoken by the first participant during the period of time based on audio received at the second endpoint via the communication session. Upon determining that an inconsistency exists between the first number and the second number, the method includes notifying at least one of the first participant and the second participant about the inconsistency.

In some embodiments, the method includes presenting information about the first number and the second number to the first participant.

In some embodiments, the method includes receiving a message indicating the second number from the second endpoint and, after receiving the message, comparing the second number to the first number to determine the inconsistency.

In some embodiments, the inconsistency comprises a difference between the first number and the second number being greater than a threshold number of words.

In some embodiments, the method includes generating a text transcript of the words spoken by the first participant and transferring the text transcript to the second endpoint for presentation to the second participant. In those embodiments, the method may include receiving a second text transcript of the words spoken by the first participant based on the audio received at the second endpoint and presenting the first participant with an indication of words missing from the second text transcript relative to the text transcript.

In some embodiments, notifying at least one of the first participant and the second participant about the inconsistency includes presenting, via the second endpoint, an alert to the second participant indicating that fewer than all of the words spoken by the first participant are being reproduced for the second participant.

In some embodiments, the method includes presenting, via the second endpoint, a metric relating the second number to the first number.

In some embodiments, the method includes determining a third number of the words spoken by the first participant during the period of time based on audio received, via the communication session, at a server facilitating the communication session and, in response to determining that a second inconsistency exists between the first number and the third number, notifying the first participant that an issue exists between the first endpoint and the server.

In some embodiments, the method includes monitoring for packet loss in the audio at the second endpoint and determining that the packet loss satisfies a packet loss threshold. In those embodiments, determining the first number and determining the second number occurs in response to determining that the packet loss satisfies the packet loss threshold.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to, during a communication session between a first endpoint operated by a first participant and a second endpoint operated by a second participant, determine a first number of words spoken by the first participant during a period of time based on sound captured by the first endpoint for inclusion on the communication session. The program instructions further direct processing system to determine a second number of the words spoken by the first participant during the period of time based on audio received at the second endpoint via the communication session. Upon determining that an inconsistency exists between the first number and the second number, the program instructions direct the processing system to notify at least one of the first participant and the second participant about the inconsistency.

DETAILED DESCRIPTION

The examples provided herein enable an endpoint a communication session to provide its user with information about whether the user's words are being heard by other participants on the communication session. For example, if words spoken by the user are not presented to another user at another endpoint on the communication session, then the user may be presented with a notification that informs the user of that fact. Upon receiving the notification, the user may at least stop speaking given that their words are not all being heard but also may begin troubleshooting why their words are not being heard. The user does not need to rely on reactions of other users or network statistics, which may not be understood, to infer that their words are not being heard by others on the communication session.

Figure 1:
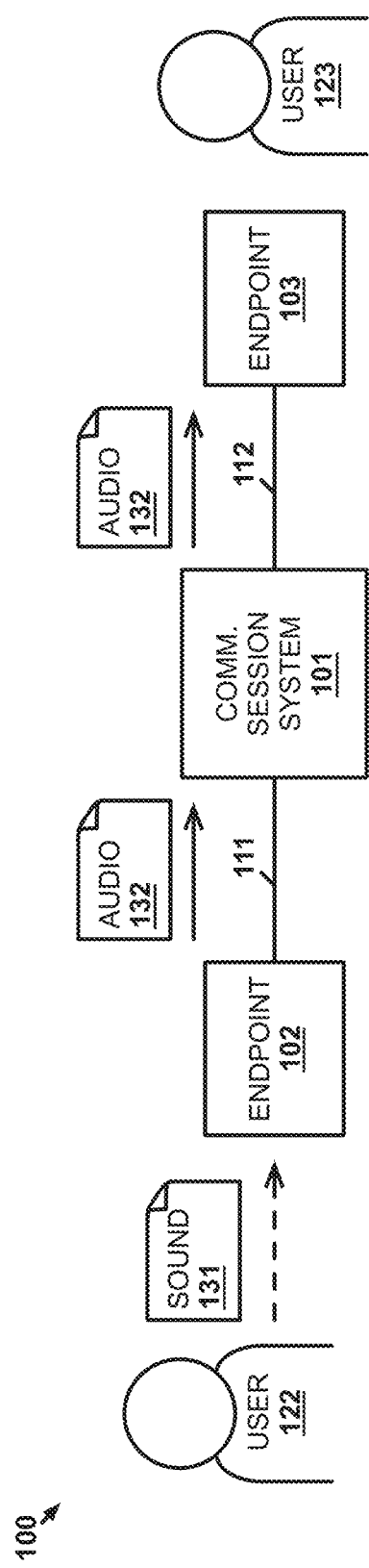
FIG. 1 illustrates an implementation for representing communication session quality using words spoken on the session.

FIG. 1 illustrates implementation 100 for representing communication session quality using words spoken on the session. Implementation 100 includes communication session system 101, endpoint 102, and endpoint 103. User 122 operates endpoint 102 and user 123 operates endpoint 103. Endpoint 102 and communication session system 101 communicate over communication link 111. Endpoint 103 and communication session system 101 communicate over communication link 112. Communication links 111-112 are shown as direct links but may include intervening systems, networks, and/or devices.

In operation, endpoint 102 and endpoint 103 may each respectively be a telephone, tablet computer, laptop computer, desktop computer, conference room system, or some other type of computing device capable of connecting to a communication session facilitated by communication session system 101. Communication session system 101 facilitates communication sessions between two or more endpoints, such as endpoint 102 and endpoint 103. In some examples, communication session system 101 may be omitted in favor of a peer-to-peer communication session between endpoint 102 and endpoint 103. A communication session may be audio only (e.g., a voice call) or may also include at least a video component (e.g., a video call). During a communication session, user 122 and user 123 are able to speak with, or to, one another by way of their respective endpoints 102 and 103 capturing their voices and transferring the voices over the communication session.

Figure 2:
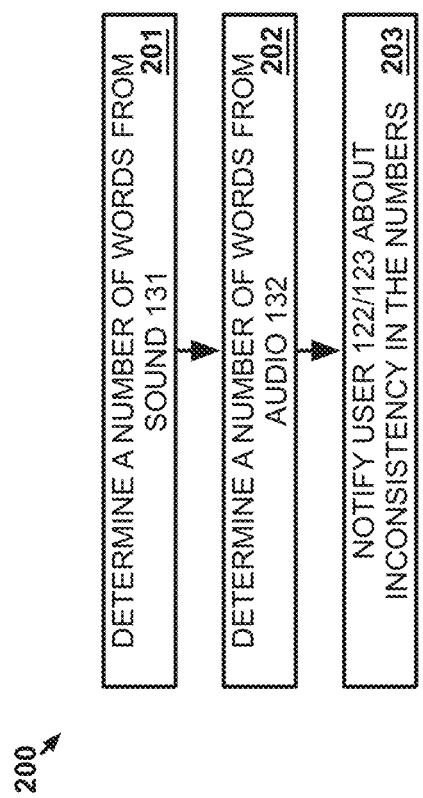
FIG. 2 illustrates an operation to represent communication session quality using words spoken on the session.

FIG. 2 illustrates operation 200 to represent communication session quality using words spoken on the session. In operation 200, user 122 and user 123 are participants on a communication session established between endpoint 102 and endpoint 103. Operation 200 is an example of how, during the communication session, one or both of endpoints 102 and 103 may notify their respective users 122 and 123 when the number of words spoken by user 122 is inconsistent with the number of words that end up being presented by endpoint 103 to user 123. In operation 200, endpoint 102 determines a number of words spoken by user 122 during a period of time based on sound 131 captured by endpoint 102 for inclusion on the communication session (201). Sound 131 is processed by endpoint 102 into audio 132, which is transferred from endpoint 102 over the communication session. In some examples, a speech to text algorithm (e.g., a Natural Language Processing (NLP) algorithm) may be used on audio 132 to recognize the words captured from sound 131 and then the words in the period of time are counted to arrive at the number of words. In other examples, an algorithm may be trained, or otherwise configured, to count the number of words being said in audio 132 without having to recognize the actual words (e.g., by recognizing voice inflections and/or pauses between words). The period of time is measured within audio 132 (e.g., between timestamps in audio 132) so that latency or clock differences between endpoint 102 and endpoint 103 do not cause endpoint 102 to use a different period than endpoint 103. The period of time may be any length of time and may be measured in temporal units (e.g., seconds) or in words. The period of time may be one in a sequence of periods in which words are counted (e.g., sequential 5 second periods). In some examples, the period of time is a rolling time period that always extends back from the current time (e.g., the last 5 seconds or the last 10 words) or may be measured between a defined start point, such as the time at which the session was established, and the current time. In some cases, a rolling period of time may be set to a long enough duration that false positives can be avoided while still being able to notify users of an inconsistency relatively quickly. For instance, if the period of time is set to one second, then even one error in processing/counting the number of words could indicate an inconsistency even if no inconsistency exists. Likewise, a user may not care if one word is missed here and there but, rather, may want to know if words are being dropped consistently.

After receiving audio 132 over the communication session, endpoint 103 determines a number of the words spoken by user 122 during the period of time from audio 132 (202). In this example, audio 132 passes through communication session system 101 on its path to endpoint 103, although, in other examples, the path of audio 132 may skip communication session system 101. Endpoint 103 may process audio 132 in the same manner that endpoint 102 processed audio 132 above to determine the number of words, although, it is possible for endpoint 103 to determine the number of words in a different manner (e.g., using a different algorithm). In some examples, the algorithm may recognize that a word is not comprehendible (e.g., audio 132 cuts out mid word) and does not count that word. In those examples, if a similar algorithm was used at endpoint 102, then the number determined at endpoint 102 would also not include such words in its count. Likewise, if the word was comprehendible at endpoint 102 but not at endpoint 103, it would be included in the count at endpoint 102 and not in the count at endpoint 103.

Upon determining that an inconsistency exists between the number of words determined by endpoint 102 and the number of words determined by endpoint 103, either or both of user 122 and user 123 are notified about the inconsistency (203). An inconsistency may exist if the numbers are compared and do not match or are not within a predetermined threshold value (e.g., amount or percentage of each other). For example, a threshold may indicate that, if the number determined by endpoint 103 is not at least 90% of the number determined by endpoint 102, then the user notification is triggered. The inconsistency may be determined at communication session system 101, endpoint 102, or endpoint 103. The numbers determined by either or both of endpoint 102 and endpoint 103 may, therefore, be transferred to the system performing the inconsistency determination. For example, if endpoint 102 determines the inconsistency, then endpoint 103 would transfer the number it determined in a message to endpoint 102 for comparison to the number determined by endpoint 102. If the inconsistency is determined at a system other than the endpoint actually presenting a user notification to its user, then notifying the user includes transferring a message indicating the inconsistency to the endpoint, which triggers the endpoint to present a user notification. Similarly, it should be understood that operation 200 may be performed wholly in one of the systems in implementation 100 (i.e., endpoints 102/103 and communication session system 101) or operation 200 may be distributed across the systems. In examples where one system performs operation 200, then the determining steps may comprise the operation performing system determining the number of words by receiving a message indicating the number of words from another system that actually counted the number of words from audio 132 (e.g., endpoint 102 receives the number of words from endpoint 103).

The user notification may simply indicate to user 122 and/or user 123 that fewer than all words captured by endpoint 102 from user 122 are being presented to user 123 by endpoint 103. The user notification may be a graphic on a display screen of endpoint 102/103, an illumination of a light element (e.g., light emitting diode) on endpoint 102/103, an audible alert (e.g., a tone, tone pattern, voice message, etc.), a vibration alert, or some other manner in which a user interface may notify a user—including combinations thereof. In some examples, the notification may include additional information about the inconsistency, such as indicating a number of words that are not being presented at endpoint 103 during the period of time (or some other time period, such as the entire session) or indicating specific words that are not being presented. For instance, endpoint 102 and endpoint 103 may each generate a text transcript of the words being counted, compare the two transcripts to identify words that are missing from endpoint 103's transcript, and then present endpoint 102's transcript with an indication (e.g., highlighting) of what words are missing from endpoint 103's transcript. Such a transcript presentation at endpoint 103 would inform user 123 about words spoken user 122 that are being missed from endpoint 103's presentation of audio 132 but may also be beneficial to user 122 if presented by endpoint 102.

Advantageously, either or both of user 122 and user 123 are notified when something, such as a network issue, is causing words captured from user 122 to not be presented to user 123. In some examples, operation 200 may be performed in the opposite direction as well (i.e., on sound captured by endpoint 103 and transferred as audio to endpoint 102 for presentation). Likewise, operation 200 may be performed with more than two endpoints on a communication session. For instance, if a third endpoint is on the communication session, the third endpoint would perform similarly to endpoint 102 in the above example. If an inconsistency is determined, the either or both of user 122 and the user of the third endpoint are notified about the inconsistency. In that example, user 123 is likely not notified of the inconsistency between the two other systems, although, there may be situations where user 123 would find the information useful and, therefore, is notified.

Figure 3:
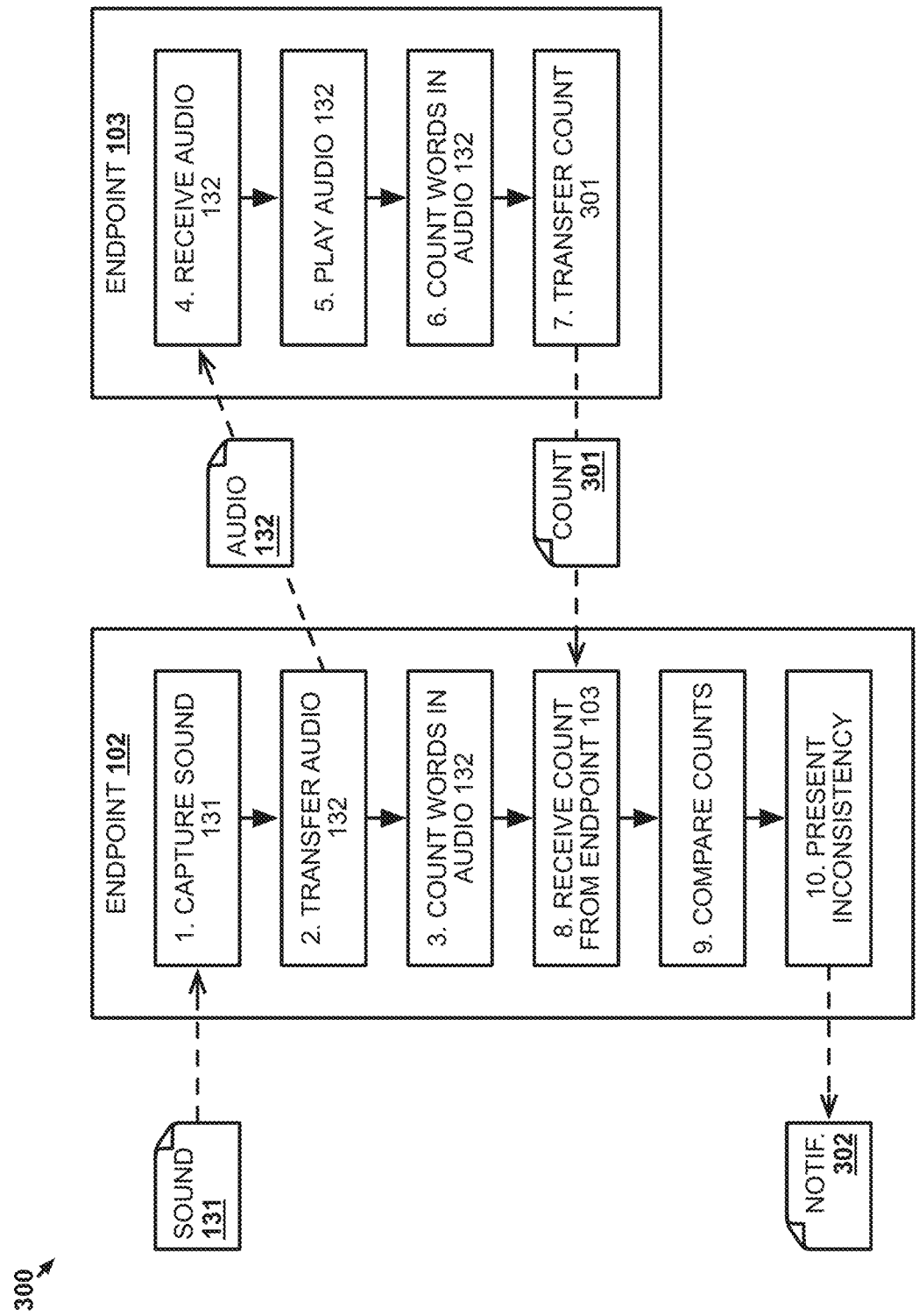
FIG. 3 illustrates an operational scenario for representing communication session quality using words spoken on the session.

FIG. 3 illustrates operational scenario 300 for representing communication session quality using words spoken on the session. Operational scenario 300 is one example of operation 200 with additional details about steps being performed by endpoint 102 and endpoint 103. Endpoint 102 captures sound 131 to create audio 132 at step 1. Endpoint 102 may use a built in microphone to capture sound 131, a wired or wireless peripheral microphone connected to endpoint 102, or some other type of microphone(s) to capture sound 131. Sound 131 includes at least speech from user 122 but may include other sound, such as background noise, as well. Endpoint 102 transfers audio 132 over a communication session with endpoint 103 at step 2. Endpoint 102 also processes audio 132 with a language processing algorithm to identify and count words spoken by user 122 in audio 132 at step 3. Steps 2 and 3 may occur in real-time as sound 131 is captured. As such, audio 132 may be streamed form endpoint 102 to endpoint 103 as part of real-time user communications on the communication session.

As audio 132 is received by endpoint 103 at step 4, endpoint 103 plays audio 132 to user 123 at step 5. Endpoint 103 also processes audio 132 with a language processing algorithm to identify and count words spoken by user 122 within audio 132, which generates word count 301, at step 6. Word count 301 is sent to endpoint 102 at step 7. Steps 4-7 may all occur in real time so that endpoint 103 can continually update endpoint 102 with word count 301. In some cases, word count 301 may be transferred upon all words having been counted for a period of time (e.g., for a 5 second increment of the session) before a new word count 301 is determined from new audio 132 being received.

Upon receiving word count 301 at step 8, endpoint 102 compares word count 301, at step 9, to the number of words counted in step 3, which will represent the number of words in the same period of time within audio 132. If endpoint 102 determines via the comparison that an inconsistency exists between the two counts, endpoint 102 presents notification 302 about the inconsistency to user 122 at step 10. While endpoint 103 does not notify user 123 in this example, in other examples, endpoint 102 may transfer a message to endpoint 103 indicating the inconsistency and endpoint 103 may present to user 123 a notification similar to notification 302. Also, since an inconsistency may not exist during a first time period, it should be understood that steps 1-9 may be performed for subsequent time periods until an inconsistency is identified before moving to step 10.

Figure 4:
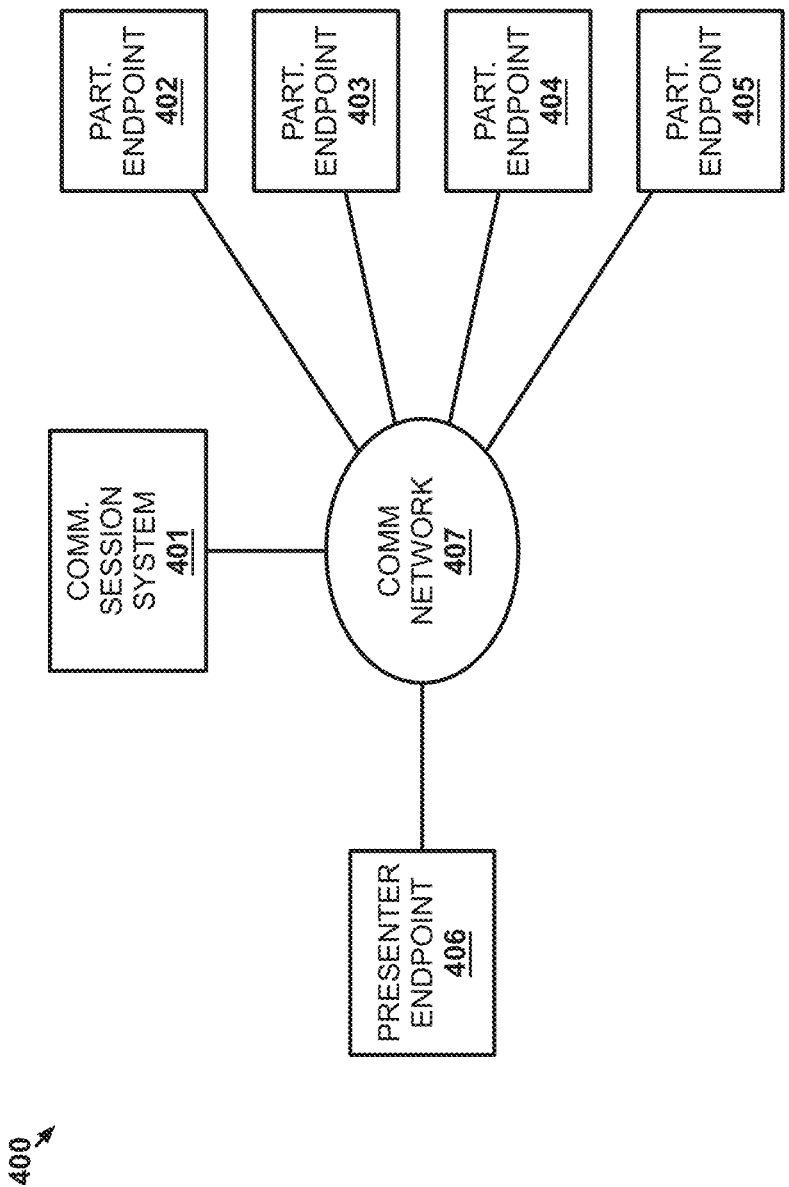
FIG. 4 illustrates an implementation for representing communication session quality using words spoken on the session.

FIG. 4 illustrates implementation 400 for representing communication session quality using words spoken on the session. Implementation 400 includes communication session system 401, endpoints 402-406, and communication network 407. Communication network 407 includes one or more local area networks and/or wide area computing networks, including the Internet, over which communication session system 401 and endpoints 402-406. Endpoints 402-406 may each comprise a telephone, laptop computer, desktop workstation, tablet computer, conference room system, or some other type of user operable computing device. Communication session system 401 may be an audio/video conferencing server, a packet telecommunications server, a web-based presentation server, or some other type of computing system that facilitates user communication sessions between endpoints. Endpoints 402-406 may each execute a client application that enables endpoints 402-406 to connect to communication sessions facilitated by communication session system 401 and provide features associated therewith, such as the word inconsistency notifications described herein.

In this example, presenter endpoint 406 is operated by a user who is a presenting participant on a communication session facilitated by communication session system 401. The presenting participant may be the moderator of the communication session, may be a designated presenter (e.g., may be sharing their screen or otherwise presenting information), may simply be the current speaker, or is otherwise considered to be presenting at present during the communication session. As such, in some cases, the presenter endpoint may change depending on who is currently speaking (or who is the designated presenter) on the communication session while, in other cases, the presenter endpoint may be static throughout the communication session.

Figure 5:
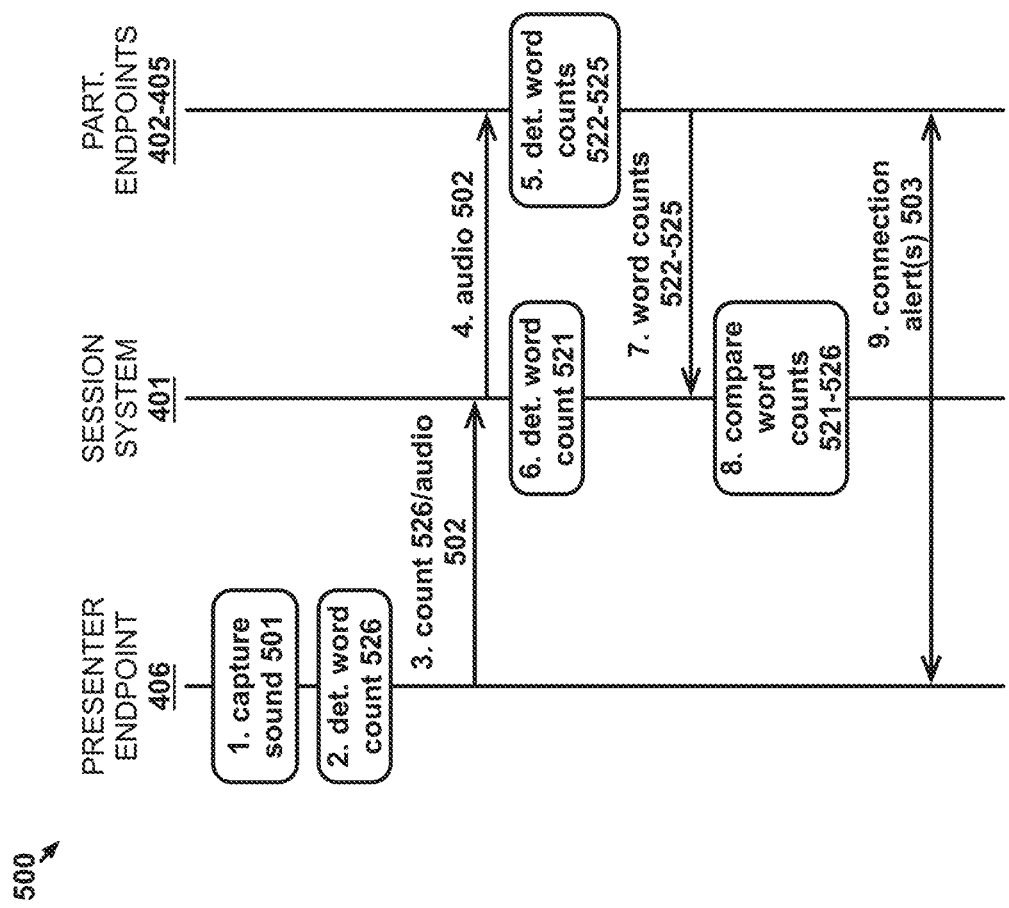
FIG. 5 illustrates an operational scenario for representing communication session quality using words spoken on the session.

FIG. 5 illustrates operational scenario 500 for representing communication session quality using words spoken on the session. In this example, communication session system 401 compares word counts determined by each of endpoints 402-406 and communication session system 401 itself to determine whether audio at any of participant endpoints 402-405 does not include words captured at presenter endpoint 406 from the presenting participant. Comparing word counts at each node enables communication session system 401 to better pinpoint where an issue causing words to be missing exists.

Operational scenario 500 begins with presenter endpoint 406 capturing sound 501, at step 1, to generate audio 502 for transfer as real-time user communications on a communication session between endpoints 402-406. From audio 502, presenter endpoint 406 counts the spoken words in audio 502 for a predefined period of time to create word count 526 at step 2, which indicates the number of words counted during the period of time. Both word count 526 and audio 502 are transferred to communication session system 401 at step 3. Audio 502 is transferred over the communication session in real-time while word count 526 may be transferred upon completion of the period of time in a message out of band from audio 502. Communication session system 401 passes audio 502 to participant endpoints 402-405 in real time over the communication session at step 4. After receiving audio 502, participant endpoints 402-405 determine their own respective word counts 522-525 of words spoken in audio 502 at step 5 and communication session system 401 determines its own word count 521 of words spoken in audio 502 at step 6. It should be understood that word counts 521-525 are all determined for the same period of time within audio 502 as word count 526. Though not shown, it should be understood that participant endpoints 402-405 also play audio 502 to their respective users in real time as part of the ongoing communication session.

Communication session system 401 receives word counts 522-525 from participant endpoints 402-405 at step 7. Communication session system 401 then compares word counts 522-526 to determine whether an inconsistency exists between word count 526 and any of word counts 522-525. As noted above, an inconsistency may exist if a word count is even one word less than word count 526 or there may be a larger threshold in place that requires the word count to differ more from word count 526 (e.g., 5 words) before qualifying as an inconsistency. Based on which word counts are inconsistent, communication session system 401 is able to identify between which two systems something (e.g., a network issue) is occurring that likely caused the inconsistency. For example, if communication session system 401 determines that an inconsistency only exists between word count 525 and word count 526, then communication session system 401 determines that something between communication session system 401 and participant endpoint 405, which determined word count 525, caused audio 502 to be missing words when played at participant endpoint 405. In another example, if communication session system 401 determines that an inconsistency exists between all of word counts 522-525 and word count 526, then something between communication session system 401 and all of participant endpoints 402-405 or something between presenter endpoint 406 and communication session system 401 is causing the missing words. In this case, since communication session system 401 also determines word count 521, if an inconsistency exists between word count 521 and word count 526, then communication session system 401 determines that something between communication session system 401 and presenter endpoint 406 is causing the missing words. Alternatively, if no inconsistency is found between word count 521 and word count 526, then communication session system 401 determines that something between communication session system 401 and participant endpoints 402-405 is causing the inconsistency between word count 526 and word counts 522-525 (e.g., if audio 502 is transcoded by communication session system 401, there may be an issue with that transcoding).

After determining between which systems inconsistencies exist, communication session system 401 transfers one or more connection alerts 503, at step 9, for presentation to users of endpoints 402-406 that receive one of connection alerts 503. In this example, connection alerts 503 are not only notify the user(s) about word inconsistencies but also notify the users about where in the communication path the inconsistency is being caused. For instance, if something between communication session system 401 and participant endpoint 405 is determined to cause an inconsistency in words counted in audio 502 at participant endpoint 405, then connection alerts 503 will indicate to the users that something is causing words to be lost on the connection between communication session system 401 and participant endpoint 405. While alerts 503 are called connection alerts 503, it should be understood that factors other than a network connection between connection alerts 503 may be causing the missing words.

Connection alerts 503 may be provided to all of endpoints 402-406 or to a select subset of endpoints 402-406, such as endpoints on either end of the determined inconsistency, which would be presenter endpoint 406 and one or more of participant endpoints 402-405. Preferably, presenter endpoint 406 is always notified about an inconsistency so that the presenting user of presenter endpoint 406 can be aware that one or more users are not hearing everything being said. The presenter may then choose to canyon or wait before continuing to speak depending on who, or how many users, are not hearing everything being said. On the other end of the conversation, notifying a user of one of participant endpoints 402-405 that they are missing words being spoken allows the user to potentially troubleshoot the issue or, if necessary, ask the presenter to repeat themselves. Notifying other users, who may not be experiencing missing words, may also be beneficial to notify those users about an issue at another endpoint that may need to be addressed by the presenter, which would affect their experience on the communication session.

Knowledge of where an issue is being caused may help a user troubleshoot what might be causing the issue. For instance, if participant endpoint 405 is provided with a connection alert 503 when an inconsistency is determined between word count 525 and word count 521, then the user of participant endpoint 405 will be informed via connection alert 503 that they are not being presented with all the words spoken by the presenter at presenter endpoint 406 and that an issue with their connection to the communication session (i.e., to communication session system 401) is the cause. Without that knowledge, the user may instead think that the missing words issue is instead being caused by presenter endpoint 406's connection to the communication session. Thus, connection alerts 503 advantageously provide users of endpoints 402-406 with more information about determined word count inconsistencies, so that appropriate action may be taken.

Figure 6:
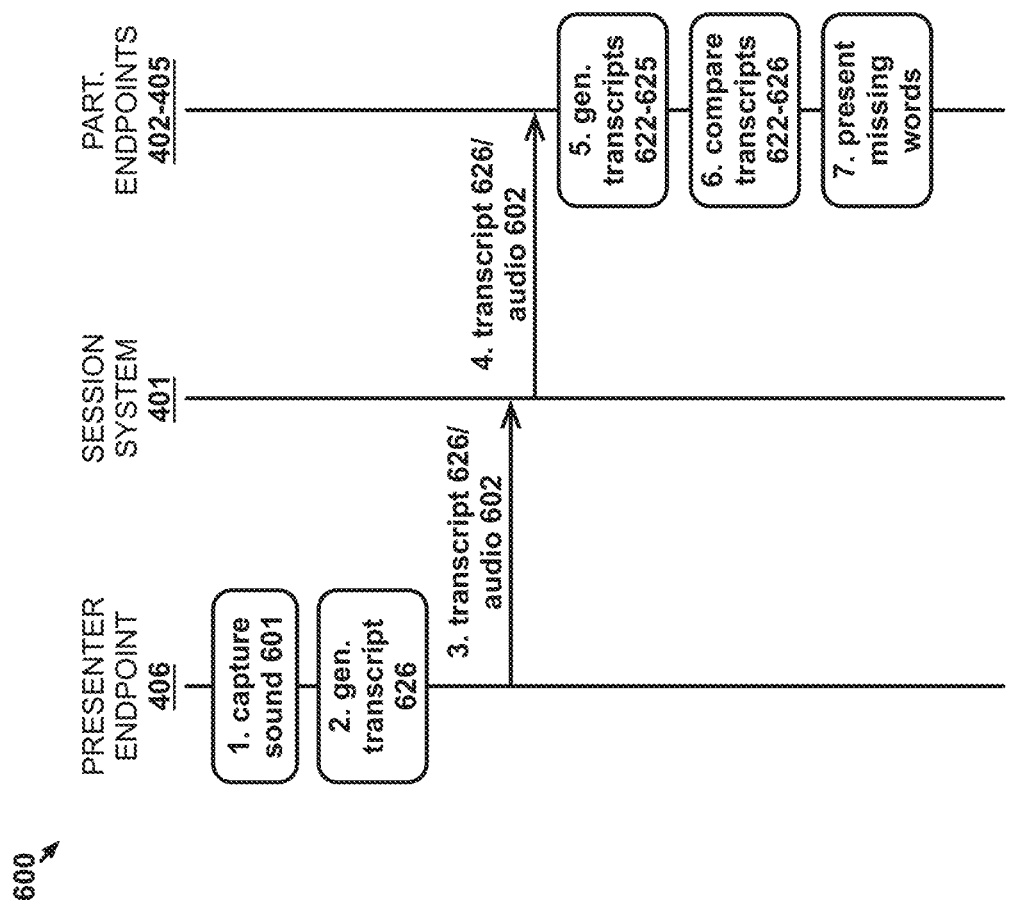
FIG. 6 illustrates another operational scenario for representing communication session quality using words spoken on the session.

FIG. 6 illustrates operational scenario 600 for representing communication session quality using words spoken on the session. Operational scenario 600 is an example where text transcripts are generated to indicate which words spoken by the presenting user at presenter endpoint 406 are missing from audio received on a communication session between endpoints 402-406. Operational scenario 600 begins with presenter endpoint 406 capturing sound 601, at step 1, to generate audio 602 for transfer as real-time user communications on the communication session between endpoints 402-406. Presenter endpoint 406 generates transcript 626 from audio 602 at step 2. Generation of transcript 626 may be performed using a speech to text algorithm and may be performed in real time (i.e., as words are captured). In the examples above, a transcript may be generated so that words can be counted from the generated transcript, which may also be performed in operational scenario 600 for similar reasons, though not discussed. While the above examples may not do anything with the transcript after counting the words therein, transcript 626 in this example is transferred in a message to communication session system 401 at step 3. Audio 602 is also transferred to communication session system 401, at step 3, in real time over the communication session. Transcript 626 may also be transferred in real time (e.g., each word is transferred as it is identified by the algorithm) or may be transferred in some other increment (e.g., in increments corresponding to the period of time used for the word count or in some other increment).

Both audio 602 and transcript 626 are transferred from communication session system 401 to participant endpoints 402-405 at step 4. Audio 602 is transferred in real time and transcript 626 is transferred in the same interval it was received from presenter endpoint 406, which may also be real time. Upon receiving audio 602, participant endpoints 402-405 generate respective transcripts 622-625 at step 5. Transcripts 622-625 may be generated using the same algorithm as was used to generate transcript 626 and may be generated in real time as words are received in and played from audio 602 by participant endpoints 402-405. The words of transcript 626 are compared to the words in each of transcripts 622-625 to identify words that may be missing from one or more of transcripts 622-625 at step 6. For example, if transcript 626 includes the word "action" corresponding to a particular time within audio 602 and transcript 622 generated by participant endpoint 402 does not include the word "action" in association with the particular time of audio 602 (e.g., is completely missing or could not be determined due to audio degradation), then the word "action" is a missing word. Rather than comparing words to their associated time stamp to determine that a word is missing, participant endpoint 402 may identify a missing words from words around the missing word. In the above example, transcript 626 may include the sentence "you need to take action on this matter" while transcript 622 includes "you need to take on this matter". Participant endpoint 402 would recognize that transcript 622 moves directly from "take" to "on" with "action" being missing there between. Other manners of recognizing differences between transcripts may also be used.

Regardless, if a word is missing from one of transcripts 622-625, it is assumed that the word is missing because it is not included in audio 602 as received. As such, participant endpoints 402-405 present the missing words (if any) to their respective users step 7. Only the missing words may be presented or transcript 626 may be presented while indicating in the presentation which of the words in transcript 626 were not received in audio 602 (e.g., words that can be heard from received audio 602 may be displayed in one color while missing words are displayed in another color or are highlighted in some other manner). In one example, transcript 626 may be presented by participant endpoints 402-405 as scrolling vertical column of words or horizontally across a display as more of transcript 626 is received during the communication session. Preferably, transcript 626 is received fast enough that presentation of the words therein is displayed substantially in real time with the portions of audio 602 from which the displayed portions of transcript 626 are generated. In some cases, if the missing words can be identified in substantially real time, then a synthesized voice may be used to insert the missing words into audio 602 when played by the one of participant endpoints 402-405 that determined the words were missing. No matter how the missing words are presented, presenting missing words to users of participant endpoints 402-405 provides the users with additional information beyond simply indicating that words are missing (i.e., that an inconsistency exists in the words of the received audio 602).

Figure 7:
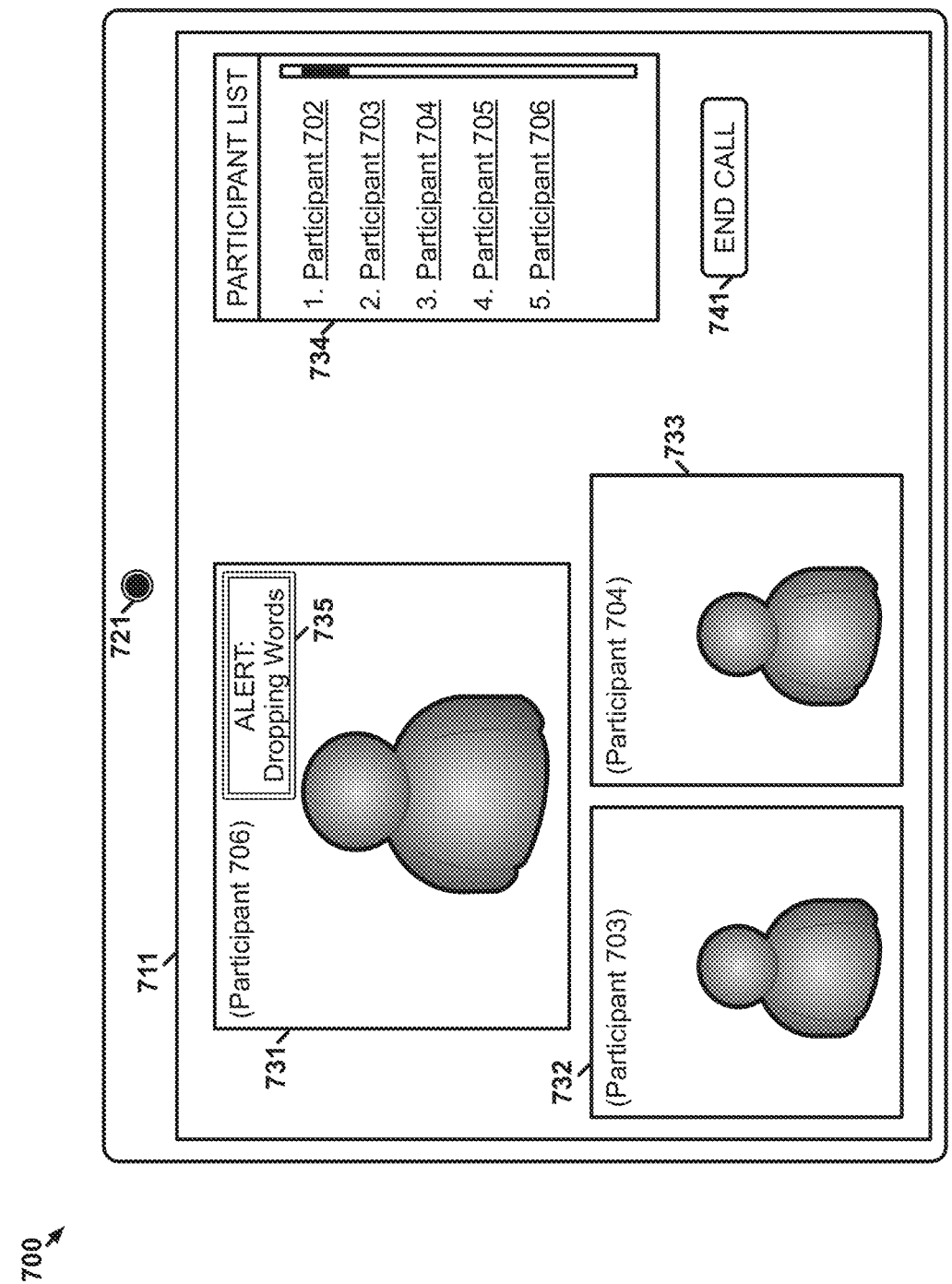
FIG. 7 illustrates a display system for representing communication session quality using words spoken on the session.

FIG. 7 illustrates display system 700 for representing communication session quality using words spoken on the session. Display system 700 includes display 711 and camera 721. Display 711 may be a cathode ray tube (CRT), Liquid Crystal Display (LCD), Light Emitting Diode display (LED), or some other type of display capable of presenting images described below. Camera 721 includes optics and an image sensor for capturing video of a participant viewing display 711. Though not shown, display system 700 may be a display system for an endpoint described elsewhere herein.

Display 711 is displaying an example Graphical User Interface (GUI) for a client application connected to a video communication session between participants 702-706, as shown in participant list 734. Participant 702 is operating the endpoint of display system 700. The GUI also shows participant windows 731-733 and end call button 741, which removes the participant at display system 700 from the communication session when pressed. Real-time video of participant 706 is shown in participant window 731, which is larger than participant window 732 and participant window 733 because participant 706 is currently speaking. Participant window 732 shows real-time video of participant 703 and participant window 733 shows real-time video of participant 704. Video of the remaining participants on the communication session may not displayed because those participants are not one of the three most recent speakers, those participants do not have video enabled, or for some other reason.

In this example, an inconsistency has been determined between the number of words spoken by participant 706 and the number of words being presented from audio of participant 706 received at the endpoint of display system 700. The inconsistency may be determined by the endpoint of display system 700 or may be determined by another endpoint or system. To notify participant 702 about the inconsistency, the GUI presents notification 735 in participant window 731. Notification 735 is a visual alert that indicates that words are being dropped from participant 706's speech when presented at participant 702's endpoint. In some examples, notification 735 may also indicate a location in the network path that is causing the dropped words. For instance, if only participant 702 is experiencing the dropped words and other participants are not, then notification 735 may indicate that the dropped words are being caused by the endpoint of participant 702 (e.g., the endpoint's connection to the communication session) rather than something else, such as participant 706's connection to the communication session. In some examples, notification 735 may indicate how many words are being dropped, may indicate the time period from which the inconsistency was determined (e.g., the last 10 seconds), or some other information concerning the inconsistency.

A similar notification to notification 735 may also be displayed at the endpoint being operated by participant 706. In those examples, the notification may also indicate which of participants 702-705 are experiencing the dropped words. If all of participants 702-705 are experiencing dropped words, then the notification may indicate that participant 706's endpoint is causing the dropped words (e.g., there may be an issue with the endpoint's connection to the communication session).

Figure 8:
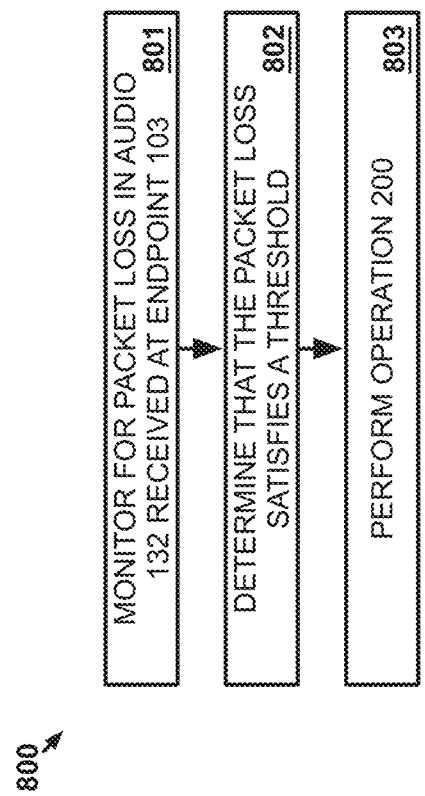
FIG. 8 illustrates an operation to represent communication session quality using words spoken on the session.

FIG. 8 illustrates operation 800 to represent communication session quality using words spoken on the session. Operation 800 occurs before operation 200 in some examples. In operation endpoint 103, endpoint 103 monitors received audio 132 for packet loss (801). During the monitoring, endpoint 103 determines whether the packet loss satisfies a threshold amount of packet loss (802). The threshold amount of packet loss is preferably set to an amount of loss that is likely to result in words being missing when audio 132 is presented at endpoint 103. For example, one or two packets lost occasionally from audio 132 may not be enough to affect whether user 123 is not presented with a word. As such, the threshold is set to correspond to a large number of packets lost per some unit of time (e.g., number of packets lost in the last 5 seconds).

Ideally, the packet loss determined while monitoring will never satisfy the threshold because the communication session has no connection issues. However, if endpoint 103 determines that the threshold amount of packet loss has been satisfied, then operation 200 is performed so that user 122 and/or user 123 can be notified whether the packet loss resulted in missing words when audio 132 is presented at endpoint 103 (803). To trigger operation 200, endpoint 103 notifies at least endpoint 102, either directly or through communication session system 101, that operation 200 should be performed. That notification ensures both endpoint 102 and endpoint 103 know to perform the steps required of them. Operation 200 may be performed on audio 132 generated/received after the threshold is satisfied. In some examples, operation 200 may be performed on the portion of audio 132 from which the lost packets satisfied the packet lost threshold. In those examples, at least the portion of audio 132 from which the packet loss was determined may be stored (e.g., buffered or cached at endpoint 103) so that the number of words in that portion of audio 132 can be determined at step 202 during operation 200. The corresponding portion of audio 132 at endpoint 102 would likewise be stored so that the number of words can also be determined thereat.

Advantageously, performing operation 800 before operation 200 is that resources for counting words (e.g., memory space, processing cycles, etc.) do not need to be used until after packet loss satisfies the threshold. Once operation 200 is performed, the packet loss that was detected by endpoint 103 is expressed to user 122 and/or user 123 in terms that can be more easily understood by users without knowledge of what packet loss entails. That is, rather than simply notifying user 122 and/or user 123 that the determined packet loss is occurring (which may also be done is some examples), user 122 and/or user 123 are informed about the consequences of the packet loss that the users are actually experiencing (i.e., that words are being missed/dropped).

It should be understood that, while operation 800 is explained above in the context of endpoint 103 performing the method steps, operation 800 can also be performed, at least in part, in endpoint 102 or communication session system 101. For example, endpoint 102 or communication session system 101 may instruct endpoint 102 to monitor for packet loss (801) and then may determine that packet loss satisfies the threshold by either receiving a notification that the threshold is satisfied from endpoint 103 or receiving a number of packets lost from endpoint 103 so that endpoint 102 or communication session system 101 can determine whether the threshold is satisfied (802). Endpoint 102 or communication session system 101 would then trigger the performance of operation 200 upon determining that the threshold is satisfied (803).

Figure 9:
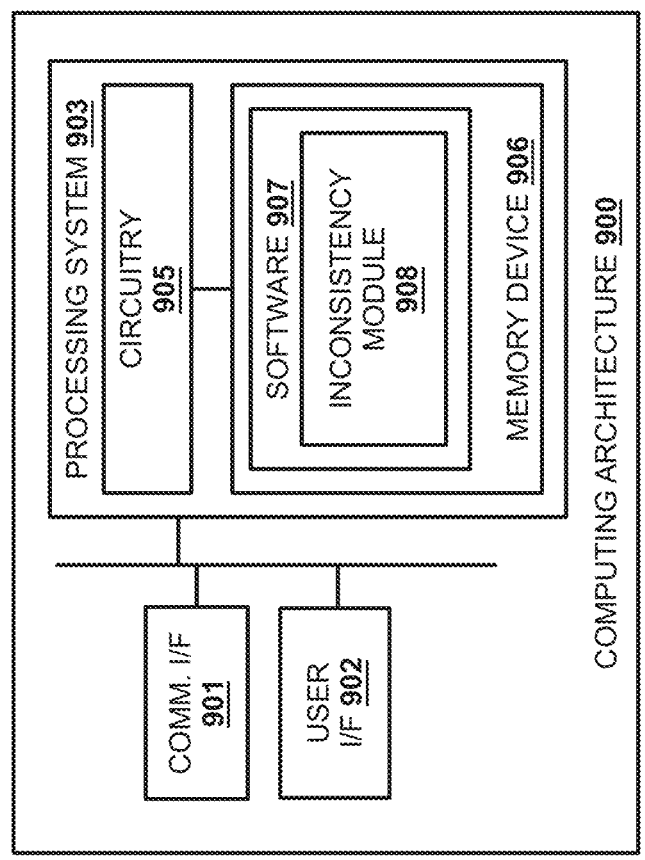
FIG. 9 illustrates a computing architecture for representing communication session quality using words spoken on the session.

FIG. 9 illustrates computing architecture 900 for representing communication session quality using words spoken on the session. Computing architecture 900 is an example computing architecture for communication session systems 101/401 and endpoints 102, 103, and 402-406, although systems 101-103 and 401-406 may use alternative configurations. Computing architecture 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a computer readable storage medium, such as a disk drive, flash drive, data storage circuitry, or some other memory apparatus. In no examples would a storage medium of memory device 906 be considered a propagated signal. Operating software 907 comprises computer programs, firmware, or some other form of machine-readable processing instructions. Operating software 907 includes inconsistency module 908. Operating software 907 may further include an operating system, utilities, drivers, network interfaces, applications, or some other type of software. When executed by processing circuitry 905, operating software 907 directs processing system 903 to operate computing architecture 900 as described herein.

In particular, during a communication session between a first endpoint operated by a first participant and a second endpoint operated by a second participant (either of which may be computing architecture 900), inconsistency module 908 directs processing system 903 to determine a first number of words spoken by the first participant during a period of time based on sound captured by the first endpoint for inclusion on the communication session and determine a second number of the words spoken by the first participant during the period of time based on audio received at the second endpoint via the communication session. Upon determining that an inconsistency exists between the first number and the second number, inconsistency module 908 directs processing system 903 to notify at least one of the first participant and the second participant about the inconsistency.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   during a communication session between a first endpoint operated by a first participant and a second endpoint operated by a second participant:
   determining a first number of words spoken by the first participant during a period of time based on sound captured by the first endpoint for inclusion on the communication session;
   determining a second number of the words spoken by the first participant during the period of time based on audio received at the second endpoint via the communication session; and
   upon determining that an inconsistency exists between the first number and the second number, notifying at least one of the first participant and the second participant about the inconsistency.

2. The method of claim 1, comprising:
   presenting information about the first number and the second number to the first participant.

3. The method of claim 1, comprising:
   receiving a message indicating the second number from the second endpoint; and
   after receiving the message, comparing the second number to the first number to determine the inconsistency.

4. The method of claim 1, wherein the inconsistency comprises a difference between the first number and the second number being greater than a threshold number of words.

5. The method of claim 1, comprising:
   generating a text transcript of the words spoken by the first participant; and
   transferring the text transcript to the second endpoint for presentation to the second participant.

6. The method of claim 5, comprising:
   receiving a second text transcript of the words spoken by the first participant based on the audio received at the second endpoint; and
   presenting the first participant with an indication of words missing from the second text transcript relative to the text transcript.

7. The method of claim 1, wherein notifying at least one of the first participant and the second participant about the inconsistency comprises:
   presenting, via the second endpoint, an alert to the second participant indicating that fewer than all of the words spoken by the first participant are being reproduced for the second participant.

8. The method of claim 1, comprising:
   presenting, via the second endpoint, a metric relating the second number to the first number.

9. The method of claim 1, comprising:
   determining a third number of the words spoken by the first participant during the period of time based on audio received, via the communication session, at a server facilitating the communication session; and
   in response to determining that a second inconsistency exists between the first number and the third number, notifying the first participant that an issue exists between the first endpoint and the server.

10. The method of claim 1, comprising:
    monitoring for packet loss in the audio at the second endpoint; and
    determining that the packet loss satisfies a packet loss threshold, wherein determining the first number and determining the second number occurs in response to determining that the packet loss satisfies the packet loss threshold.

11. An apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    during a communication session between a first endpoint operated by a first participant and a second endpoint operated by a second participant:
    determine a first number of words spoken by the first participant during a period of time based on sound captured by the first endpoint for inclusion on the communication session;
    determine a second number of the words spoken by the first participant during the period of time based on audio received at the second endpoint via the communication session; and
    upon determining that an inconsistency exists between the first number and the second number, notify at least one of the first participant and the second participant about the inconsistency.

12. The apparatus of claim 11, wherein the program instructions direct the processing system to:
    present information about the first number and the second number to the first participant.

13. The apparatus of claim 11, wherein the program instructions direct the processing system to:
    receive a message indicating the second number from the second endpoint; and
    after receiving the message, compare the second number to the first number to determine the inconsistency.

14. The apparatus of claim 11, wherein the inconsistency comprises a difference between the first number and the second number being greater than a threshold number of words.

15. The apparatus of claim 11, wherein the program instructions direct the processing system to:
    generate a text transcript of the words spoken by the first participant; and
    transfer the text transcript to the second endpoint for presentation to the second participant.

16. The apparatus of claim 15, wherein the program instructions direct the processing system to:
    receive a second text transcript of the words spoken by the first participant based on the audio received at the second endpoint; and present the first participant with an indication of words missing from the second text transcript relative to the text transcript.

17. The apparatus of claim 11, wherein to notify at least one of the first participant and the second participant about the inconsistency, the program instructions direct the processing system to:
present, via the second endpoint, an alert to the second participant indicating that fewer than all of the words spoken by the first participant are being reproduced for the second participant.

18. The apparatus of claim 11, wherein the program instructions direct the processing system to:
determine a third number of the words spoken by the first participant during the period of time based on audio received, via the communication session, at a server facilitating the communication session; and
in response to determining that a second inconsistency exists between the first number and the third number, notify the first participant that an issue exists between the first endpoint and the server.

19. The apparatus of claim 11, wherein the program instructions direct the processing system to:
monitor for packet loss in the audio at the second endpoint; and
determine that the packet loss satisfies a packet loss threshold, wherein the first number and the second number are determined in response to determining that the packet loss satisfies the packet loss threshold.

20. One or more non-transitory computer readable storage media having program instructions stored thereon that, when read and executed by a processing system, direct the processing system to:
during a communication session between a first endpoint operated by a first participant and a second endpoint operated by a second participant:
determine a first number of words spoken by the first participant during a period of time based on sound captured by the first endpoint for inclusion on the communication session;
determine a second number of the words spoken by the first participant during the period of time based on audio received at the second endpoint via the communication session; and
upon determining that an inconsistency exists between the first number and the second number, notify at least one of the first participant and the second participant about the inconsistency.

* * * * *